Nov. 10, 1964   H. W. DIETERT   3,156,112
APPARATUS FOR MEASURING MOLD WALL MOVEMENT OR CREEP
Filed May 18, 1961
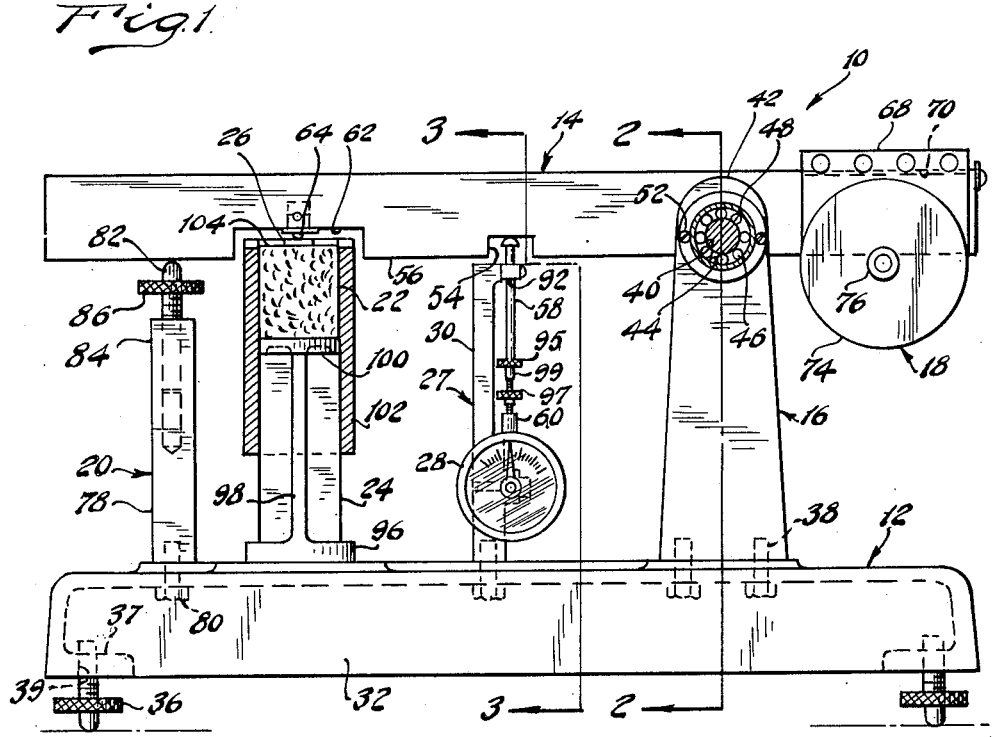
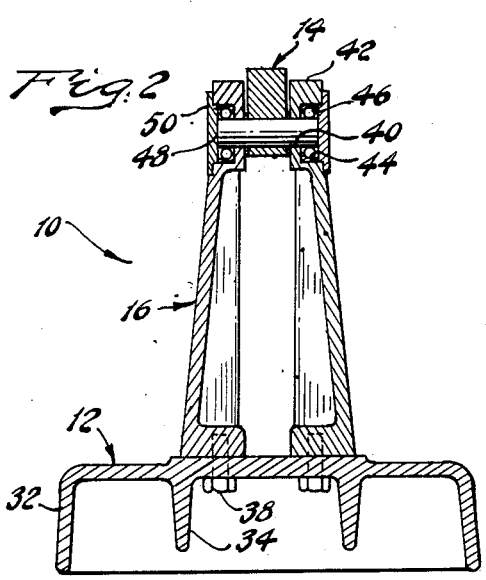
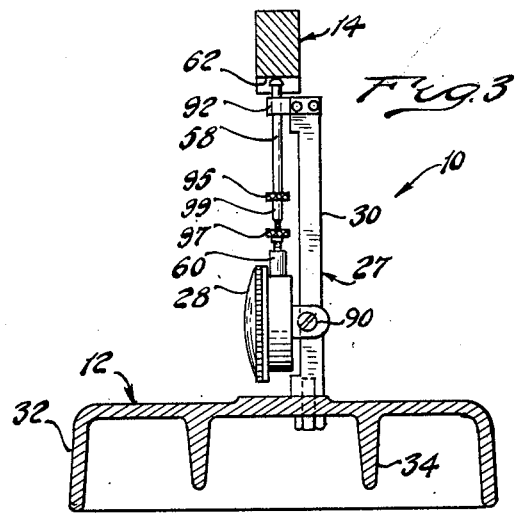
INVENTOR.
HARRY W. DIETERT
BY Whittemore
Hulbert & Belknap
ATTORNEYS.

United States Patent Office 3,156,112
Patented Nov. 10, 1964

3,156,112
APPARATUS FOR MEASURING MOLD WALL MOVEMENT OR CREEP
Harry W. Dietert, Kerrville, Tex., assignor to Harry W. Dietert Co., Detroit, Mich., a corporation of Michigan
Filed May 18, 1961, Ser. No. 111,039
6 Claims. (Cl. 73—83)

The invention relates to granular material testing and refers more specifically to an apparatus for determining the mold wall movement or creep of confined foundry sand.

In the production of castings from molten metal or similar material poured into a mold formed of tempered granular material such as foundry sand, unexpected movement of the mold wall is extremely detrimental to the finished product. Such movement of the mold wall causes variations in the size and weight of a casting from the predicted size and weight. In addition movement of a mold wall under pressure resulted from molten metal being placed within the mold permits the metal to harden under a reduced pressure which is detrimental to the soundness of the finished casting. It is therefore necessary to determine the amount of mold wall movement which will occur during pouring and hardening of a casting.

In the past measurements of the hardness of the conditioned granular material of which the mold is formed have been used to predict the movement of mold walls with some degree of accuracy. Such measurements have however not been entirely satisfactory since in the past the measurements have not been taken with a confined test specimen whereby lateral movement of the granular material often produces erroneous hardness indications as determined by creep measurements.

It is therefore one of the objects of the present invention to provide an improved apparatus for measuring mold wall movement or creep of a granular material for use in foundry molds including confining a test specimen during the testing thereof.

Another object is to provide improved apparatus for measuring creep of granular material for use in producing foundry molds including means for confining a test specimen during the measurement.

Another object is to provide apparatus for measuring creep of granular material comprising means for confining a uniformly compacted specimen of the granular material, means for applying a predetermined weight to a predetermined area of the confined specimen for a predetermined length of time, and means inidcating the movement of the weight during the predetermined time.

Another object is to provide apparatus for measuring the creep of granular material comprising a pivotally mounted lever, means for supporting a confined specimen of granular material beneath a portion of the lever, a contact plate in contact with the surface of the specimen on which the free end of the lever is supported to load the granular material, a weight variably positionable along the lever, loading means positioned beneath the lever for controlling the loading of the specimen by the lever supported weight and indicator means in fixed position relative to the specimen and in contact with the lever for indicating the movement of the lever after load has been applied to the specimen through the contact plate.

Another object is to provide an apparatus for measuring mold wall movement or granular material creep which is simple, economical and efficient.

Other objects and features of the invention will become apparent as the description proceeds, especially when taken in conjunction with the accompanying drawings, illustrating a preferred embodiment of the invention, wherein:

FIGURE 1 is an elevation view of apparatus for measuring creep of granular material with a sample specimen positioned thereon wherein the sample tube is shown in section.

FIGURE 2 is a cross section of the apparatus illustrated in FIGURE 1 taken on line 2—2 in FIGURE 1.

FIGURE 3 is a cross section of the apparatus illustrated in FIGURE 1 taken on the line 3—3 in FIGURE 1.

With particular reference to the figures of the drawings, an embodiment of the present invention will now be disclosed.

As best illustrated in FIGURE 1 the apparatus 10 for measuring the creep of granular material for use in producing molds for foundry castings or the like comprises a base 12, a lever 14 pivotally mounted on support brackets 16 and a weight assembly 18 adapted to be variably positioned along the lever 14. The creep measuring apparatus 10 further includes a loading means 20 operable to permit loading of a confined test specimen 22 of granular material positioned on specimen support 24 through the contact plate 26 by lever 14, and the indicating means 27 including indicator 28 and the support 30 therefor for indicating the movement of the lever 14 relative to the test specimen 22 on application of load to the specimen 22.

More specifically the base 12 is shaped as shown in FIGURES 1–3 and includes the peripheral flanges 32 and the stiffening ribs 34. Adjustable legs 36 are provided for leveling the creep testing apparatus 10 and may be secured to the base 12 in any convenient manner such as by providing bosses 37 in the base 12 having threaded openings 39 therein.

The supporting brackets 16, best shown in FIGURES 1 and 2, are secured to the base 12 by convenient means, such as bolts 38. The support brackets 16 include transverse openings 40 therein at the upper end 42 thereof having the radially enlarged portion 44. Bearings 46 are positioned in the radially enlarged portion 44 of the passage 40 through the support bracket 16 in which the pivot pin 48 for lever 14 is journalled. Covers 50 are secured over the radially enlarged portion 44 of the openings 40 by convenient means, such as screws 52 to secure the bearings 46 in position, as shown best in FIGURE 2.

Lever 14 is an elongated member of generally rectangular cross section and includes a notch 54 in the bottom 56 thereof. The bottom of the notch 54 is engageable with the pin 58 for transmitting movement of the lever 14 to the actuating rod 60 of indicator 28 as will be considered in more detail subsequently.

A second notch 62 is provided in the bottom 56 of the lever 14. An abutment 64 is secured to the lever 14 centrally of the bottom of recess 62 which abutment is adapted to engage contact plate 26 which is positioned on the test specimen 22 in measuring the creep of the confined granular material as will also be considered in more detail subsequent.

Weight assembly 18 includes a U-shaped saddle 68 adapted to be guided by the lever 14 in movement axially thereof by means of a groove 70 in the connecting portion thereof. Weights 74 are secured to the saddle portion 68 of the weight assembly 18 at each side thereof by convenient means, such as bolts 76. Graduations are provided along the length of the top of the lever 14 for use in determining the correct position of the weight assembly 18 during a creep measurement.

Loading means 20 includes the post 78 which may be secured to base 12 by convenient means, such as bolt 80. A loading abutment 82 is threadedly received in the end 84 of the loading post 78 and is provided with a knurled disc 86 to permit ready adjustment of the abutment 82 axially of the post 78 on rotation thereof.

Dial indicator 28 is fixedly secured to the indicator post 30 by convenient means, such as bolt 90, as indicated best in FIGURE 3. The pin 58 is guided in movement axially of the actuating rod 60 of the indicator 28 by bracket 92 secured to the top of indicator post 30. Knurled disc 95 and abutment 97 threadedly received in end 99 of pin 58 are provided to adjust the effective length of pin 58.

The specimen support 24 comprises a pedestal 96 which may be secured to the base 12 by convenient means (not shown), the crossed vertical supports 98 and the disc shaped head 100 rigidly secured to the vertical supports 98.

With the creep measuring apparatus 10 illustrated in FIGURES 1–3 when it is desired to measure the creep of a particular granular material so that the movement of a wall of a mold constructed of the material may be predicted a test specimen of the granular material is compacted to the same hardness as that to which the sand will be rammed in the mold while confined in a specimen tube 102. The tube 102 is then positioned over the specimen support 24 as illustrated in FIGURE 1 so that the bottom and sides of the test specimen 22 are rigidly confined.

At this time the lever 14 which has previously been pivoted in a clockwise direction about pin 48 to permit placing of the specimen tube 102 over the specimen support 24 is rotated in a counterclockwise direction to engage the abutment 82 which is positioned to prevent the abutment 64 from engaging the contact plate 26 previously placed on the surface 104 of the test specimen 22. The weight assembly 18 is then moved to a predetermined position to apply a small seating load to the contact plate 26 on movement of the abutment 82 out of contact with the lever 14. Abutment 82 is then moved out of contact with the lever 14 to apply the seating load to the contact plate 26. At this time the indicator 28 is set to a zero indication.

The abutment 82 is then caused to again engage the lever 14 and the weight assembly 18 is moved to the left in FIGURE 1 to apply a predetermined load to the contact plate 26 on disengagement of the abutment 82 with the lever 14. Abutment 82 is then caused to disengage the lever 14 for a predetermined time and the deflection of the gauge 28 over the predetermined time is observed as an indication of the creep of the confined granular material specimen.

The measured movement of the indicator 28 or creep of the granular material will therefore be a composite of initial compression of the granular material of the test specimen 22 beneath the contact plate on application of full load thereto and the plastic movement of the granular material occurring over a substantial length of time while the load is sustained thereon. Such measurements when taken with the granular material laterally confined as in the specimen tube 102 have been found to give extremely accurate indications of the amount of mold wall movement to be expected when the granular material is used to produce molds for casting objects of material, such as molten metal. Similar tests of unconfined samples in contrast often produce erroneous indications of the mold wall movement to be expected.

It will of course be understood that the interpretation of the movement of the indicator 28 will depend on the weight of the weight assembly, the position thereof along the lever 14, the ramming of the test specimen 22 and the diameter of contact plate 26. Standard test specimens which have given consistent results have been two inches in diameter rammed in a specimen tube to the hardness of the mold to be formed thereby when used with contact plates having one-half square inch area in contact with the surface 104 of the test specimen and weights of approximately fifteen pounds positioned immediately adjacent the abutment 82 and when the distance between the abutment 82 and the pivot pin 48 of the lever 14 is approximately thirteen inches. During the measurement a distance between the indicating means 28 and pivot pin 48 giving good results has been approximately five inches while the distance between the pivot pin 48 and the center of the specimen has been approximately ten inches. These particular numeric values are not of course meant to be limiting but are given as an example of relative dimensions of one embodiment of successful creep measuring apparatus constructed as illustrated in FIGURES 1–3.

The drawings and the foregoing specification constitute a description of the improved method and apparatus for measuring mold wall movement or creep in such full, clear, concise and exact terms as to enable any person skilled in the art to practice the invention, the scope of which is indicated by the appended claims.

What I claim as my invention is:

1. Apparatus for measuring creep of granular material comprising a base, a pair of brackets secured to the base adjacent one end thereof, a lever, means pivotally mounting the lever between the brackets with the lever extending between the ends of and generally parallel to the base with the apparatus in operation, support means positioned on said base adjacent the other end thereof for confining a specimen of granular material, a confined specimen of granular material supported by the support means and having an exposed unconfined surface, a contact plate positioned on the unconfined surface of the specimen having an area small relative to the area of the unconfined surface of the specimen, said lever being engageable with the contact plate on pivotal movement of said lever in one direction, a weight assembly operably associated with and variably positionable on the lever to bias the lever in said one direction, means supported on said base and engageable with said lever for controlling the loading of the contact plate by said lever and means secured to the base and operable between the base and lever for indicating relative movement between said unconfined surface of the specimen of granular material and lever after engagement of the lever with the contact plate.

2. Structure as set forth in claim 1 wherein the means for controlling the loading of the contact plate comprises a post rigidly secured to the base at said other end of the base and an axially adjustable loading abutment threadedly received in said post and engageable with the lever on pivoting of the lever in said one direction.

3. Structure as set forth in claim 1 wherein the support means comprises a vertically extending support having a disc secured to one end thereof and fastened to said base at the other end, a cylinder having substantially the same interior diameter as the diameter of the disc one end of which is sleeved over the disc and support whereby the cylinder is supported on the support by contact of the disc with a compacted specimen of granular material within the other end of said cylinder.

4. Structure as set forth in claim 1 wherein the means for indicating relative movement between said unconfined surface of the specimen of granular material and lever comprises a support secured to the base having a guide opening extending therethrough, an indicator actuating pin extending through said guide opening one end of which engages said lever, a knurled disc secured to the pin adjacent the other end thereof, a threaded recess in the other end of said pin, a pin extension threaded into said recess having an abutment thereon and an indicator secured to said support including an actuating rod projecting therefrom and engaged with said abutment on said pin extension.

5. Structure as set forth in claim 1 wherein said lever is an elongated member substantially rectangular in cross section and said weight assembly includes a U-shaped member having a pair of parallel extending legs and a connecting portion engageable with the top surface of said lever at variable positions therealong and weights secured to the leg portions of said U-shaped member.

6. Apparatus for measuring creep of granular material comprising an elongated substantially rectangular horizontally extending base, means secured thereto for levelling said base, a pair of vertically extending spaced apart brackets secured to the base adjacent one end thereof, a lever extending longitudinally of the base in parallel spaced relation thereto between the ends thereof, means pivotally mounting the lever between the brackets including stepped aligned openings in the brackets adjacent the upper end thereof, a pivot pin extending through said aligned openings and said lever, bearings within the stepped recesses in each of said brackets for rotatably supporting said pivot pin and covers secured in said stepped recesses over said bearings, support means positioned on said base adjacent the other end thereof and beneath said lever for confining a specimen of granular material including a specimen support having a disc at one end thereof and being fastened to said base at the other end, and a cylinder having substantially the same interior diameters as the diameter of the disc one end of which is sleeved over the disc and support, whereby the cylinder is supported on the support by contact with the disc of a compacted specimen of granular material within the other end of said cylinder, a confined specimen of granular material supported by the support means and having an exposed unconfined upper surface, a contact plate positioned on the unconfined surface of the specimen having an area small relative to the area of the unconfined surface of the specimen, a notch in the bottom of said lever immediately over said support means, an abutment secured to the lever within the notch having a lower surface in radial alignment with the axis of the pivot pin engageable with the contact plate on pivotal movement of said lever in one direction, a weight assembly positioned on said lever and movable axially thereof to bias the lever in one direction, including a U-shaped member having a pair of substantially parallel legs and a connecting portion which connecting portion is engageable with the top of said lever and weights secured to the legs of said U-shaped member, means supported on said base and engageable with said lever for controlling the loading of the contact plate by said lever including a post rigidly secured to the base at the other end thereof and an axially adjustable loading abutment threadedly received in said post and engaged with the lever and means operable between the base and lever for indicating relative movement between said unconfined surface of the specimen of granular material and lever after engagement of the lever with the contact plate including an indicator post secured to the base between the brackets and support means having a guide opening extending vertically therethrough, a second notch in the lower surface of said lever aligned with said opening and having a bottom surface in radial alignment with the axis of said pivot pin, a vertically extending indicator actuating pin extending through said guide opening with the upper end thereof engaging the bottom of said second notch and including a knurled disc secured to the pin adjacent the lower end thereof and a threaded recess in the lower end thereof, a pin extension threaded into said threaded recess having an abutment thereon and an indicator secured to said support including an actuating rod projecting therefrom and engaged with said abutment on said pin extension.

References Cited in the file of this patent

UNITED STATES PATENTS

| | | |
|---|---|---|
| 1,516,207 | Rockwell | Nov. 18, 1924 |
| 1,519,602 | Zimmerman et al. | Dec. 16, 1924 |
| 1,597,668 | Brier | Aug. 31, 1926 |
| 1,874,842 | Abrahamson | Aug. 30, 1932 |
| 1,875,134 | Pfund | Aug. 30, 1932 |
| 2,561,266 | Dietert | July 17, 1951 |
| 2,916,913 | Stevenson | Dec. 15, 1959 |

OTHER REFERENCES

Publication: Tinius Olsen Bulletin 50–A, Tinius Olsen Testing Machine Company, Easton Road, Willow Grove, Pa. Copy received U.S. Patent Office, Jan. 2, 1959.